(12) United States Patent
Ko et al.

(10) Patent No.: US 12,385,812 B2
(45) Date of Patent: Aug. 12, 2025

(54) METHOD OF MANUFACTURING REFERENCE SAMPLE, METHOD OF MEASURING DROPLET, AND APPARATUS FOR MEASURING DROPLET

(71) Applicant: SAMSUNG DISPLAY CO., LTD., Yongin-si (KR)

(72) Inventors: Young Soo Ko, Yongin-si (KR); Yeon Jae Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 351 days.

(21) Appl. No.: 17/842,049

(22) Filed: Jun. 16, 2022

(65) Prior Publication Data
US 2023/0152193 A1 May 18, 2023

(30) Foreign Application Priority Data
Nov. 16, 2021 (KR) .......................... 10-2021-0158047

(51) Int. Cl.
*G01N 1/28* (2006.01)
*G06T 7/215* (2017.01)
(52) U.S. Cl.
CPC ........... *G01N 1/2806* (2013.01); *G06T 7/215* (2017.01); *G06T 2207/30204* (2013.01)

(58) Field of Classification Search
None
See application file for complete search history.

(56) References Cited

U.S. PATENT DOCUMENTS

| | | | | |
|---|---|---|---|---|
| 2014/0347420 | A1* | 11/2014 | Clark | ................. B41J 2/2142 |
| | | | | 347/19 |
| 2017/0191925 | A1* | 7/2017 | Otsuka | ................. G06T 7/0016 |
| 2018/0284007 | A1* | 10/2018 | Crow | ................. G01N 15/1459 |
| 2018/0330520 | A1* | 11/2018 | Brücker | ................. G06T 7/80 |
| 2019/0219494 | A1* | 7/2019 | Otsuka | ............... G01N 15/1492 |

FOREIGN PATENT DOCUMENTS

CN 109435473 B 10/2019

* cited by examiner

*Primary Examiner* — Laura Martin
*Assistant Examiner* — Mark A Shabman
(74) *Attorney, Agent, or Firm* — CANTOR COLBURN LLP

(57) ABSTRACT

A method of manufacturing a reference sample includes discharging a droplet, obtaining a plurality of captured images by capturing the droplet according to a predetermined period with respect to an imaginary plane defined on a falling path of a discharged droplet, analyzing the plurality of captured images, and marking a point corresponding to the falling path of the droplet on a sample substrate based on a result of analyzing the plurality of captured images.

20 Claims, 9 Drawing Sheets

MP: MP11, MP12, MP13, MP14, MP21, MP22, MP23, MP24

METHOD OF MANUFACTURING REFERENCE SAMPLE, METHOD OF MEASURING DROPLET, AND APPARATUS FOR MEASURING DROPLET

The application claims priority to Korean Patent Application No. 10-2021-0158047, filed on Nov. 16, 2021, and all the benefits accruing therefrom under 35 U.S.C. § 119, the content of which in its entirety is herein incorporated by reference.

BACKGROUND

1. Field

Embodiments of the invention relate to a method of manufacturing a reference sample, a method of measuring a droplet, and an apparatus for measuring a droplet.

2. Description of the Related Art

A semiconductor device, a display device, and other electronic device may include a plurality of thin films. The plurality of thin films may be formed by various methods such as photolithography and inkjet printing.

SUMMARY

In a case of forming a thin film by inkjet printing, the thin film may be formed by discharging a droplet. When the amount of the droplet discharged, the direction in which the droplet is discharged, the direction in which the discharged droplet falls, etc. may not be constant, such that the reliability of the thin film formed by the droplet may be lowered.

Embodiments of the invention provide a method of manufacturing a reference sample capable of manufacturing a reference sample used to measure a droplet discharging characteristic of a droplet discharging apparatus.

Embodiments of the invention provide a droplet discharging apparatus and a method of measuring a droplet with simplification and high precision.

According to an embodiment of the invention, a method of manufacturing a reference sample includes discharging a droplet; obtaining a plurality of captured images by capturing the droplet according to a predetermined period with respect to an imaginary plane defined on a falling path of the droplet; analyzing the plurality of captured images; and marking a point corresponding to the falling path of the droplet on a sample substrate based on a result of analyzing the plurality of captured images.

In an embodiment, the obtaining the plurality of captured images may include sequentially irradiating light to the imaginary plane at a first time point and a second time point after the first time point according to the predetermined period; and obtaining the plurality of captured images corresponding to the droplet on the imaginary plane by receiving the light passed through the imaginary plane.

In an embodiment, the light may be radiated for a period from a time point at which the droplet is discharged from a nozzle to a time point at which falling motion of the droplet ends.

In an embodiment, the obtaining the plurality of captured images may include obtaining a first captured image at the first time point; and obtaining a second captured image at the second time point.

In an embodiment, the analyzing the plurality of captured images may include extracting information on the falling path of the droplet, a falling speed of the droplet, and a size of the droplet based on the plurality of captured images.

In an embodiment, the analyzing the plurality of captured images may include analyzing the first captured image to analyze a position and a size of the droplet at the first time point; and analyzing the second captured image to analyze a position and a size of the droplet at the second time point.

In an embodiment, the marking the point corresponding to the falling path of the droplet may include marking marking points on the sample substrate based on points corresponding to the position of the droplet at the first time point and the position of the droplet at the second time point.

In an embodiment, a shape of the marking points may correspond to a shape of the droplet.

In an embodiment, the marking points may include a shade.

In an embodiment, the sample substrate may include a light-transmitting material.

According to an embodiment of the invention, a method of measuring a droplet discharged from a nozzle onto a substrate includes discharging the droplet; irradiating light between the substrate and the nozzle according to a predetermined period during a period from a time point at which the droplet is discharged from the nozzle to a time point at which the droplet arrives on the substrate; obtaining a droplet capture image by receiving the light irradiated from a light source and passed through the droplet falling toward the substrate; and comparing the droplet capture image with a reference sample. The reference sample may include marking points provided based on points corresponding to a reference falling path of the droplet.

In an embodiment, the obtaining the droplet capture image may include obtaining a first droplet capture image at a first time point; and obtaining a second droplet capture image at a second time point after the first time point.

In an embodiment, the marking points may include a marking point for a point corresponding to the reference falling path of the droplet at the first time point and a marking point for a point corresponding to the reference falling path of the droplet at the second time point.

In an embodiment, the comparing the droplet capture image with the reference sample may include comparing a position and a size of the droplet on the first droplet capture image with a position and a size of the marking point corresponding to the first time point; and comparing a position and a size of the droplet on the second droplet capture image with a position and a size of the marking point corresponding to the second time point.

In an embodiment, each of the marking points included in the reference sample and the droplet on the droplet capture image may include a shade.

According to an embodiment of the invention, an apparatus for measuring a droplet discharged from a nozzle onto a substrate includes a light irradiator which radiates light between the substrate and the nozzle according to a predetermined period during a period from a time point at which the droplet is discharged from the nozzle to a time point at which the droplet arrives on the substrate; an imaging generator which receives the light radiated from the light irradiator and passed through the droplet falling toward the substrate to generate a droplet capture image; and a droplet analyzer which compares the droplet capture image with a reference sample. In such an embodiment, the reference sample includes marking points provided based on points corresponding to a reference falling path of the droplet.

In an embodiment, the imaging generator may generate a first droplet capture image at a first time point and a second droplet capture image at a second time point after the first time point.

In an embodiment, the marking points may include a marking point for a point corresponding to the reference falling path of the droplet at the first time point and a marking point for a point corresponding to the reference falling path of the droplet at the second time point.

In an embodiment, the droplet analyzer may compare a position and a size of the droplet on the first droplet capture image with a position and a size of the marking point corresponding to the first time point, and compare a position and a size of the droplet on the second droplet capture image with a position and a size of the marking point corresponding to the second time point.

In an embodiment, each of the marking points included in the reference sample and the droplet on the droplet capture image may include a shade.

BRIEF DESCRIPTION OF THE DRAWINGS

The above and other features of the invention will become more apparent by describing in further detail embodiments thereof with reference to the accompanying drawings, in which.

DETAILED DESCRIPTION

Figure 1:
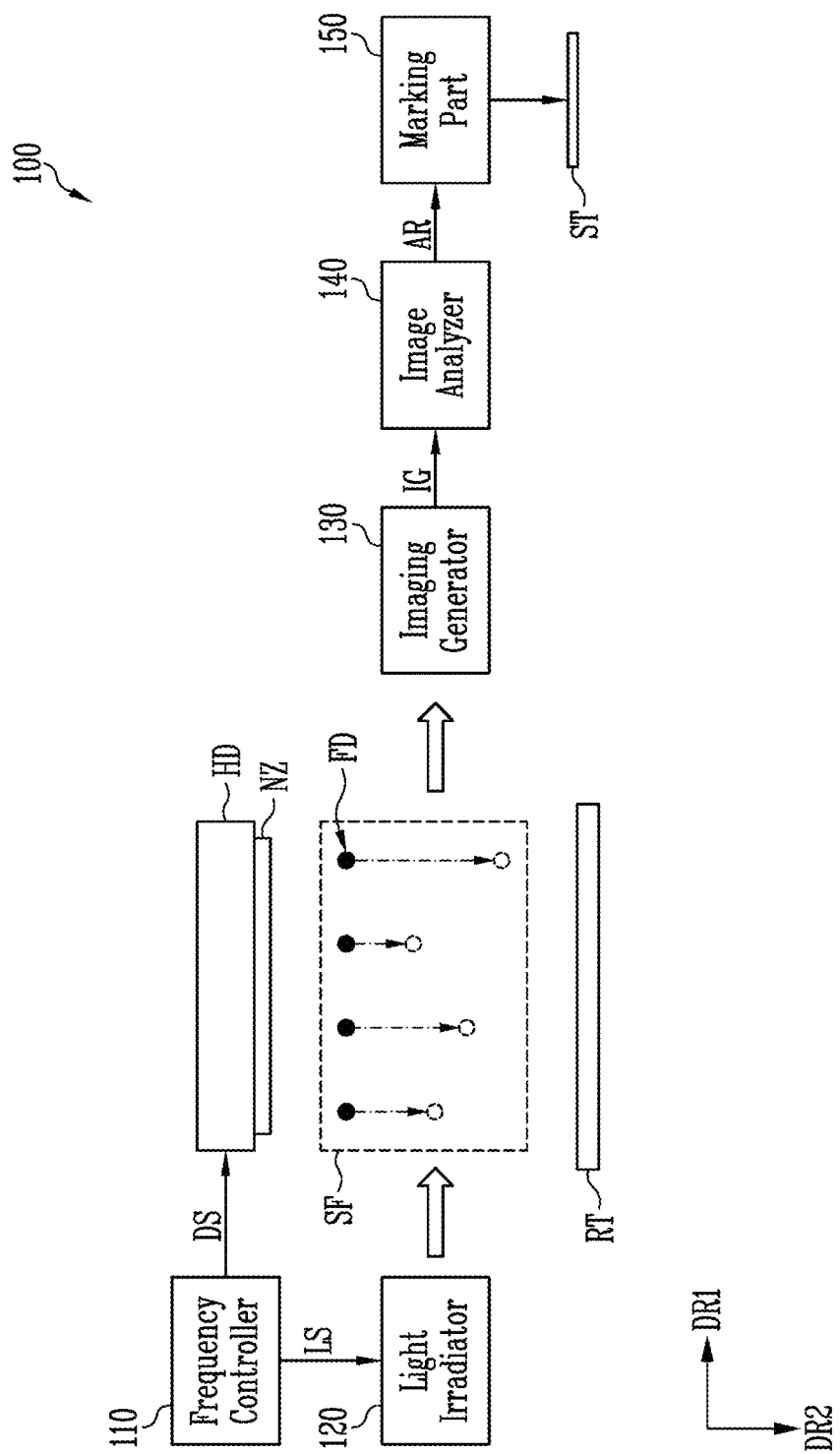
FIG. 1 is a block diagram illustrating an apparatus for manufacturing a reference sample according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments are described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described in detail with reference to the accompanying drawings.

Figure 2:
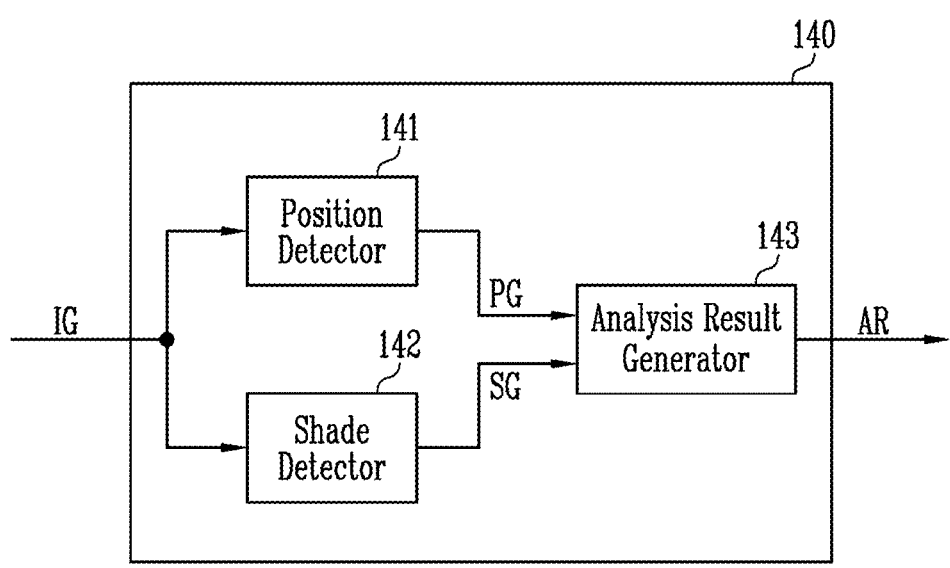
FIG. 2 is a block diagram illustrating an embodiment of an image analyzer included in the apparatus for manufacturing a reference sample of FIG. 1.
Figure 3A:
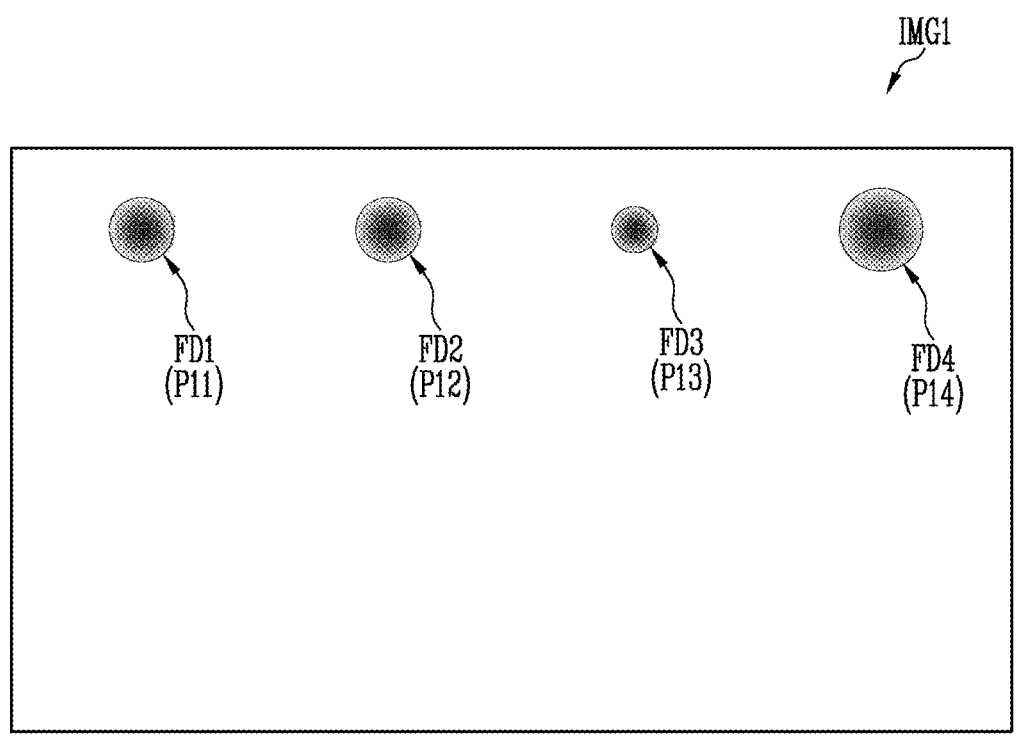
FIGS. 3A and 3B are diagrams illustrating embodiments of captured images generated by an imaging generator included in the apparatus for manufacturing a reference sample of FIG. 1.
Figure 3B:
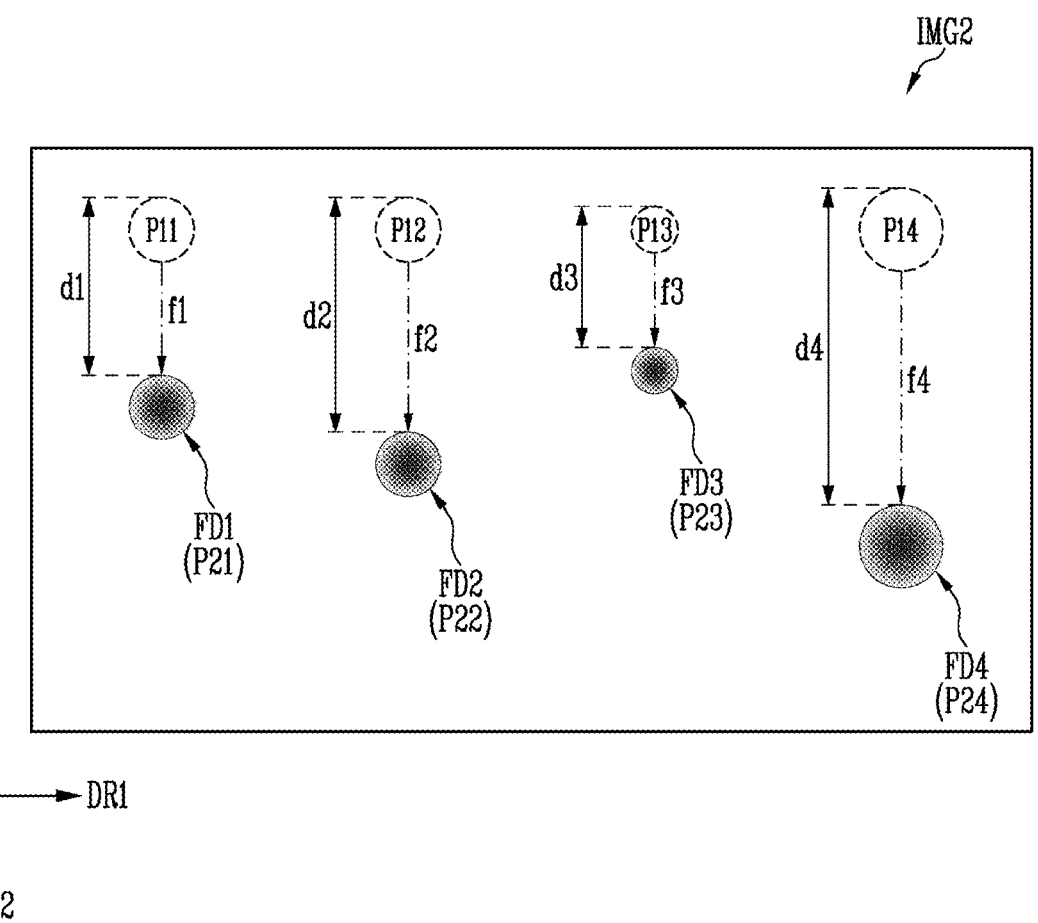
Figure 4:
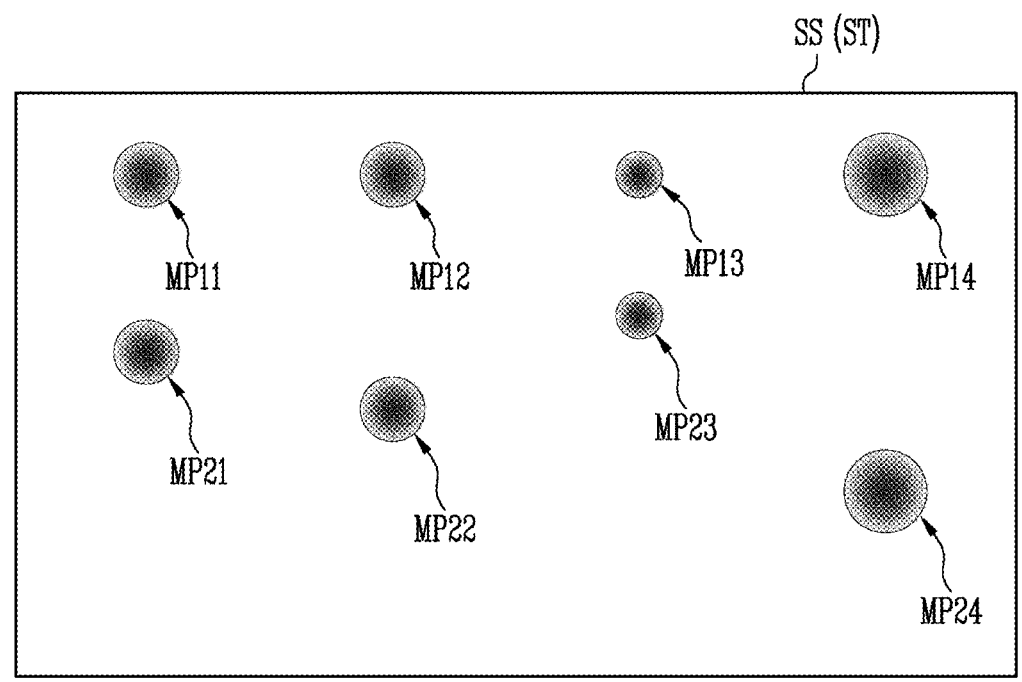
FIG. 4 is a diagram illustrating an embodiment of a reference sample generated by the apparatus for manufacturing a reference sample of FIG. 2.

FIG. 1 is a block diagram illustrating an apparatus for manufacturing a reference sample according to an embodiment of the invention. FIG. 2 is a block diagram illustrating an embodiment of an image analyzer included in the apparatus for manufacturing a reference sample of FIG. 1. FIGS. 3A and 3B are diagrams illustrating embodiments of captured images generated by an imaging generator included in the apparatus for manufacturing a reference sample of FIG. 1. FIG. 4 is a diagram illustrating an embodiment of a reference sample generated by the apparatus for manufacturing a reference sample of FIG. 2.

An embodiment of an apparatus 100 for manufacturing a reference sample according to the invention may manufacture a reference sample by marking marking points based on points corresponding to a falling path of a sample droplet FD on a sample substrate ST using a captured image obtained by capturing the sample droplet FD discharged from a droplet discharging apparatus.

In such an embodiment, the droplet discharging apparatus may be a process equipment used to form a thin film included in a semiconductor device, a display device, or other electronic device. The droplet discharging apparatus may form a thin film on a substrate by discharging a droplet onto the substrate through a nozzle using thermal pressure or mechanical pressure, and drying the solvent so that only desired substances remain on the substrate. In an embodiment, for example, the droplet discharging apparatus may be an inkjet process equipment or a jet dispenser process equipment.

However, in a process of discharging a very small amount of a droplet to form a thin film of a fine pattern using the droplet discharging apparatus, when the amount of the discharged droplet, a direction in which the droplet is discharged, and a direction in which the discharged droplet falls may not be constant due to the damage to the nozzle, a change in the material of the droplet, the process environment, and the like, such that the reliability of the thin film formed by the droplet is lowered. Accordingly, it may be desired to effectively measure the droplet to maintain process quality in the process of forming the thin film using the droplet discharging apparatus.

Accordingly, an embodiment of the apparatus 100 for manufacturing a reference sample according to the invention may manufacture the reference sample as described above, and the manufactured reference sample may be used for measuring the droplet.

In an embodiment, the apparatus 100 for manufacturing a reference sample may radiate light according to a predetermined period into the space between a nozzle NZ and a droplet receiving unit RT during a period (that is, a period during which the sample droplet FD falls) from a time point at which the sample droplet FD is discharged from the nozzle NZ attached to a head unit HD of the droplet discharging apparatus to a time point at which the sample droplet FD arrives on the droplet receiving unit RT (for example, a time point at which falling motion of the sample droplet FD ends).

In an embodiment, for example, the apparatus 100 for manufacturing a reference sample may sequentially radiate light according to the predetermined period with respect to an imaginary plane SF disposed or defined on the falling path of the sample droplet FD between the nozzle NZ and the droplet receiving unit RT. The light may be radiated with respect to the imaginary plane SF and may pass through the falling sample droplet FD. In such an embodiment, the imaginary plane SF may be an arbitrary plane disposed on the falling path of the sample droplet FD. The imaginary plane SF may be parallel to a plane formed by a direction in which the sample droplet FD falls (for example, a second direction DR2) and a direction perpendicular thereto (for example, a first direction DR1), and may mean a plane disposed between the nozzle NZ and the droplet receiving unit RT.

In an embodiment, the apparatus 100 for manufacturing a reference sample may obtain a plurality of captured images using the light passing through the falling sample droplet FD. The apparatus 100 for manufacturing a reference sample may manufacture the reference sample by extracting points corresponding to the falling path of the sample droplet FD by analyzing the obtained captured images. When forming a thin film included in a semiconductor device, a display device, and other electronic device using the droplet discharging apparatus, the reference sample manufactured by the apparatus 100 for manufacturing a reference sample may be used to measure characteristics of the discharged droplet, e.g., the amount of the discharged droplet, the direction in which the droplet is discharged, the direction in which the discharged droplet falls, and the like. Hereinafter, a process of manufacturing the reference sample by the apparatus 100 for manufacturing a reference sample according to embodiments of the invention will be described in more detail with reference to FIGS. 1 to 4.

First, referring to FIG. 1, an embodiment of the apparatus 100 for manufacturing a reference sample according to the invention may include a frequency controller 110, a light irradiator 120, an imaging generator 130, an image analyzer 140, and a marking part 150.

The frequency controller 110 may generate a first control signal DS (or a droplet discharge control signal) and a second control signal LS (or a light irradiation control signal). In such an embodiment, the first control signal DS may be used to control a time point at which the droplet discharging apparatus (or the head unit HD of the droplet discharging apparatus) discharges the sample droplet FD. The second control signal LS may be used to control a time point at which the light irradiator 120 radiates light onto the imaginary plane SF defined on the falling path of the discharged sample droplet FD. The first control signal DS may be provided to the droplet discharging apparatus (or the head unit HD of the droplet discharging apparatus), and the second control signal LS may be provided to the light irradiator 120.

The head unit HD of the droplet discharging apparatus may discharge at least one sample droplet FD toward the droplet receiving unit RT based on the first control signal DS. In an embodiment, for example, the head unit HD may discharge at least one sample droplet FD through the nozzle NZ toward the droplet receiving unit RT in the second direction DR2.

According to an embodiment, the head unit HD of the droplet discharging apparatus may discharge a plurality of sample droplets FD through the nozzle NZ.

A time point at which the droplet is discharged from the droplet discharging apparatus may be controlled by the first control signal DS. In an embodiment, for example, in response to a pulse of a specific level included in the first control signal DS, the droplet discharging apparatus may discharge the sample droplet FD through the nozzle NZ of the head unit HD.

In such an embodiment, as described above, when the droplet discharging apparatus is used to form a thin film on a thin film substrate, the reference sample may be used to measure the droplet to maintain process quality. Therefore, a set value (for example, a process parameter) set for the droplet discharging apparatus described with reference to FIG. 1 to discharge the sample droplet FD to manufacture the reference sample may be the same as a set value (for example, a process parameter) set for discharging a droplet (for example, a droplet for deposition) to form a thin film included in a semiconductor device, a display device, other electronic device, etc.

The light irradiator 120 may sequentially radiate light according to a predetermined period with respect to the sample droplet FD during a period in which the sample droplet FD falls based on the second control signal LS.

In an embodiment, for example, the light irradiator 120 may sequentially irradiate light a plurality of times according to the predetermined period onto the imaginary plane SF defined on the falling path of the sample droplet FD between the nozzle NZ and the droplet receiving unit RT during a period from a time point at which the sample droplet FD is discharged from the nozzle NZ to a time point at which the sample droplet FD arrives on the droplet receiving unit RT (the period during which the sample droplet FD falls).

In an embodiment, as described above, the marking points included in the reference sample may correspond to the falling path during the period in which the sample droplet FD falls, not a position of the sample droplet FD at a specific time point. Accordingly, the light irradiator 120 may irradiate light onto the imaginary plane SF at least twice during the period during which the sample droplet FD is discharged from the nozzle NZ and arrives at the droplet receiving unit RT (that is, the period during which the sample droplet FD falls) to extract the falling path of the sample droplet FD by analyzing the captured image of the sample droplet FD by the image analyzer 140 to be described later.

For convenience of description, hereinafter, a case in which the light irradiator 120 radiates light once at a time point immediately after the sample droplet FD is discharged from the nozzle NZ (for example, a first time point) and then radiates light once more at an arbitrary time point (for example, a second time point) during the period in which the sample droplet FD falls will be described as an example (that is, the light irradiator 120 radiates light twice at the first time point and the second time point during the period in which the sample droplet FD falls). However, this is merely for convenience of description, and the light irradiator 120 may radiate light at other arbitrary time points during the period in which the sample droplet FD falls.

A time point at which light is radiated from the light irradiator 120 may be controlled by the second control signal LS. In an embodiment, for example, in response to a pulse of a specific level included in the second control signal LS, the light irradiator 120 may radiate light onto the imaginary plane SF.

In an embodiment, the light irradiator 120 may include at least one light source for radiating light onto the imaginary plane SF. In an embodiment, for example, the light irradiator 120 may be implemented as a stroboscope including a strobe light source that intermittently emits light.

In such an embodiment, the reliability of the captured image IG obtained with respect to the sample droplet FD, which will be described later, may be deteriorated if the light radiated from the light irradiator 120 has a property of being diffused without having straightness, since the sensitivity of light is significantly reduced. Accordingly, in order for the light radiated from the light irradiator 120 to have straightness, the light irradiator 120 may further include a light guide member for radiating light having straightness to the sample droplet FD by changing a path of the light generated from the light source.

The light irradiated from the light irradiator 120 may pass through (or transmit) the imaginary plane SF (or sample droplets FD falling onto the imaginary plane SF) and may be provided to the imaging generator 130.

The imaging generator 130 may generate at least one captured image IG by receiving the light transmitted through the imaginary plane SF.

In an embodiment where the light irradiator 120 includes a strobe light source, the imaging generator 130 may generate the captured image IG corresponding to a still image with respect to the light that is intermittently radiated from the light irradiator 120 and has passed through the imaginary plane SF. In an embodiment, for example, the imaging generator 130 may include an image sensor (for example, a charge coupled device ("CCD") sensor, a complementary metal oxide semiconductor ("CMOS") sensor, etc.).

In such an embodiment, the imaging generator 130 may receive the light that is intermittently radiated from the light irradiator 120 according to the predetermined period and has passed through the imaginary plane SF, and may generate a plurality of captured images IG corresponding to sequential still images according to the predetermined period.

According to an embodiment, the imaging generator 130 may generate a plurality of captured images IG by receiving a plurality of lights that are radiated according to the predetermined period and have passed through the imaginary plane SF. In an embodiment, for example, as described above, during the period in which the sample droplet FD falls, since the light irradiator 120 radiates light at least twice according to the predetermined period onto the imaginary plane SF, correspondingly, the imaging generator 130 may generate the captured images IG with respect to the received lights, respectively. In an embodiment, for example, when the light irradiator 120 radiates light twice onto the imaginary plane SF at the first time point and the second time point during the period in which the sample droplet FD falls, the imaging generator 130 may generate the captured image IG of the first irradiated light and the captured image IG of the second irradiated light, respectively.

In an embodiment, for example, referring further to FIGS. 3A and 3B, FIGS. 3A and 3B show a first captured image IMG1 and a second captured image IMG2 generated by the imaging generator 130 in response to the light radiated twice according to the predetermined period at the first time point and the second time point by the light irradiator 120.

First, referring to FIG. 3A, the first captured image IMG1 shown in FIG. 3A may be a captured image generated by the imaging generator 130 with respect to the first light radiated from the light irradiator 120 at the first time point during the period in which the sample droplet FD falls. In this case, as described above, during the period in which the sample droplet FD falls, since the light irradiator 120 radiates the first light in response to the time point (the first time point) immediately after the sample droplet FD is discharged from the nozzle NZ, positions P11, P12, P13, and P14 with respect to the movement direction (that is, the second direction DR2) in which the sample droplets FD1, FD2, FD3, and FD4 falls on the first captured image IMG1 of FIG. 3A may be substantially the same. That is, relative positions of the sample droplets FD1, FD2, FD3, and FD4 along the second direction DR2 at the first time point may be substantially the same as each other.

Next, referring to FIG. 3B, the second captured image IMG2 shown in FIG. 3B may be a captured image generated by the imaging generator 130 with respect to the second light radiated from the light irradiator 120 at the second time point after the first time point during the period in which the sample droplet FD falls.

Here, as shown in FIG. 3B, according to the falling motion, positions P21, P22, P23, and P24 of the sample droplets FD1, FD2, FD3, and FD4 on the second captured image IGM2 may be different from the positions P11, P12, P13, and P14 of the sample droplets FD1, FD2, FD3, and FD4 on the first captured image IMG1.

In an embodiment, for example, since a first sample droplet FD1 discharged from the nozzle NZ falls along the second direction DR2, the position P11 of the first sample droplet FD1 at the first time point and the position P21 of the first sample droplet FD1 at the second time point may be different from each other. In an embodiment, for example, according to falling motion of the first sample droplet FD1, the position P21 of the first sample droplet FD1 at the second time point may correspond to a position separated by a predetermined distance d1 along the second direction DR2 compared to the position P11 of the first sample droplet FD1 at the first time point.

In an embodiment, since a second sample droplet FD2 discharged from the nozzle NZ falls along the second direction DR2, the position P12 of the second sample droplet FD2 at the first time point and the position P22 of the second sample droplet FD2 at the second time point may be different from each other. In an embodiment, for example, according to falling motion of the second sample droplet FD2, the position P22 of the second sample droplet FD2 at the second time point may correspond to a position separated by a predetermined distance d2 along the second direction DR2 compared to the position P12 of the second sample droplet FD2 at the first time point.

In an embodiment, since a third sample droplet FD3 discharged from the nozzle NZ falls along the second direction DR2, the position P13 of the third sample droplet FD3 at the first time point and the position P23 of the third sample droplet FD3 at the second time point may be different from each other. In an embodiment, for example, according to falling motion of the third sample droplet FD3, the position P23 of the third sample droplet FD3 at the second time point may correspond to a position separated by a predetermined distance d3 along the second direction DR2 compared to the position P13 of the third sample droplet FD3 at the first time point.

In an embodiment, since a fourth sample droplet FD4 discharged from the nozzle NZ falls along the second direction DR2, the position P14 of the fourth sample droplet FD4 at the first time point and the position P24 of the fourth sample droplet FD4 at the second time point may be different from each other. In an embodiment, for example, according to falling motion of the fourth sample droplet FD4, the position P24 of the fourth sample droplet FD4 at the second time point may correspond to a position separated by a predetermined distance d4 along the second direction DR2 compared to the position P14 of the fourth sample droplet FD4 at the first time point.

In such an embodiment, the speed of the falling motion of the sample droplets FD1, FD2, FD3, and FD4 in the second direction DR2 may be different from each other depending on the pressure discharged from the nozzle NZ, the sizes (volumes) of the discharged sample droplets FD1, FD2, FD3, and FD4, and the like.

In an embodiment, for example, as shown in FIG. 3B, in a case where the first sample droplet FD1 and the second sample droplet FD2 have a same size (e.g., volume) as each other, when the pressures discharged from the nozzle NZ are different from each other, the speeds of falling motions of the first sample droplet FD1 and the second sample droplet FD2 may be different from each other. In an embodiment, for example, when the pressure at which the second sample droplet FD2 is discharged is greater than the pressure at which the first sample droplet FD1 is discharged, the speed of the falling motion of the second sample droplet FD2 may be greater than the speed of the falling motion of the first sample droplet FD1. Accordingly, the distance d2 at which the second sample droplet FD2 falls may be greater than the distance d1 at which the first sample droplet FD1 falls during a period between the first time point and the second time point.

In an embodiment, as shown in FIG. 3B, in a case where the pressures discharged from the nozzle NZ are the same as each other, when the sizes (volumes) of the third sample droplet FD3 and the fourth sample droplet FD4 are different from each other, the speeds of falling motions of the third sample droplet FD3 and the fourth sample droplet FD4 may be different from each other. In an embodiment, for example, when the size (volume) of the fourth sample droplet FD4 is greater than the size (volume) of the third sample droplet FD3, the speed of the falling motion of the fourth sample droplet FD4 may be greater than the speed of the falling motion of the third sample droplet FD3. In an embodiment, for example, when the size (volume) of the fourth sample droplet FD4 is greater than the size (volume) of the third sample droplet FD3, the speed of the falling motion of the fourth sample droplet FD4 may be greater than the speed of the falling motion of the third sample droplet FD3 depending on the influence of air resistance or the like. Accordingly, the distance d4 at which the fourth sample droplet FD4 falls may be greater than the distance d3 at which the third sample droplet FD3 falls during the period between the first time point and the second time point.

In such an embodiment, after the droplet discharging apparatus discharges the sample droplets FD1, FD2, FD3, and FD4, all of the sample droplets FD1, FD2, FD3, and FD4 may fall in substantially a same direction (for example, directions f1, f2, f3, and f4 moving parallel to the second direction DR2).

However, alternatively, the light irradiator 120 may irradiate light onto the imaginary plane SF three or more times during the period in which the sample droplet FD falls. In such an embodiment, the imaging generator 130 may generate the captured images IG for each of the lights radiated three or more times.

Referring back to FIG. 1, the plurality of captured images IG generated by the imaging generator 130 may be provided to the image analyzer 140.

The image analyzer 140 may extract information on the falling path, falling speed, size (volume), and the like of the falling sample droplets FD by analyzing the captured images IG, so that analysis result information AR may be generated.

In an embodiment, for example, referring further to FIG. 2, the image analyzer 140 may include a position detector 141, a shade detector 142, and an analysis result generator 143.

The position detector 141 may generate position information PG by detecting the position of the sample droplet FD at a time point at which the light radiated from the light irradiator 120 passes through the imaginary plane SF using the captured image IG.

In an embodiment, for example, the position detector 141 may detect information on positions of the discharged sample droplets FD1, FD2, FD3, and FD4 based on the first captured image IMG1 of FIG. 3A and the second captured image IMG1 of FIG. 3B. In an embodiment, for example, the position detector 141 may generate the position information PG by detecting the positions P11 and P21 of the first sample droplet FD1 at the first time point and the second time point, the positions P12 and P22 of the second sample droplet FD2 at the first time point and the second time point, the positions P13 and P23 of the third sample droplet FD3 at the first time point and the second time points, and the positions P14 and P24 of the fourth sample droplet FD4 at the first time point and the second time point using the captured images IMG1 and IMG2.

The shade detector 142 may generate shade information SG by detecting the size (volume) and a change in the size (volume) of the sample droplet FD using the captured image IG.

In an embodiment, for example, as shown in FIGS. 3A and 3B, images of portions corresponding to the sample droplets FD1, FD2, FD3, and FD4 on the first captured image IMG1 and the second captured image IMG2 may be darkest in center portions and gradually brighter toward edge portions. Images of portions in which the sample droplets FD1, FD2, FD3, and FD4 are not located on the first captured image IMG1 and the second captured image IMG2 may be relatively brighter than the images of the portions corresponding to the sample droplets FD1, FD2, FD3, and FD4. This is because, when the light radiated from the light irradiator 120 passes through the sample droplets FD1, FD2, FD3, and FD4, the amount of light changes (for example, decreases) in the portion where the light passes through the sample droplets FD1, FD2, FD3, and FD4. Here, since diameters of center portions of the sample droplets FD1, FD2, FD3, and FD4 are larger than edge portions, the images of the portions corresponding to the sample droplets FD1, FD2, FD3, and FD4 may be the darkest at center portions and gradually lighten toward edge portions. Accordingly, the shade detector 142 may generate the shade information SG by detecting the sizes (volumes) of the sample droplets FD1, FD2, FD3, and FD4 and the changes in the sizes (volumes) according to the falling motion by detecting shades of the first captured image IMG1 and the second captured image IMG2.

According to an embodiment, the shade detector 142 may further perform a processing of removing an afterimage with respect to shades of the captured image IG. In an embodiment, for example, the captured image IG may be a still image obtained by radiating light to the falling sample droplet FD. Therefore, each of the shades of the captured image IG may include a relatively dark portion in a peripheral portion of the sample droplet FD in addition to a portion where the sample droplet FD is substantially located due to the falling motion of the sample droplet FD. Accordingly, the shade detector 142 may process portions of the shades having a brightness greater than or equal to a predetermined threshold as portions in which the sample droplet FD is not located.

The analysis result generator 143 may receive the position information PG from the position detector 141 and may receive the shade information SG from the shade detector 142.

The analysis result generator 143 may generate the analysis result information AR by analyzing the positions and sizes (volumes) of the sample droplets FD according to the falling motion and the change in the sizes (volumes), based on the position information PG and the shade information SG.

In an embodiment, for example, the analysis result generator 143 may generate the analysis result information AR by extracting the sizes (volumes) and positions P11, P12, P13, and P14 of the sample droplets FD1, FD2, FD3, and FD4 at the first time point, and extracting the changes in the sizes (volumes) and positions P21, P22, P23, and P24 of the sample droplets FD1, FD2, FD3, and FD4 at the second time point based on the position information PG and the shade information SG.

In an embodiment, the analysis result information AR may include an image in which both shades corresponding to the sample droplets FD1, FD2, FD3, and FD4 displayed on the first captured image IMG1 and shades corresponding to the sample droplets FD1, FD2, FD3, and FD4 displayed on the second captured image IMG2 are displayed.

The analysis result information AR generated by the analysis result generator 143 may be provided to the marking part 150.

The marking part 150 may manufacture the reference sample by marking marking points on the sample substrate ST based on points corresponding to falling paths of the sample droplets FD based on the analysis result information AR.

In an embodiment, for example, the marking part 150 may mark marking points on the sample substrate ST based on the shades of the captured images IG, that is, points corresponding to the positions of the sample droplets FD, based on the analysis result information AR.

In an embodiment, for example, referring further to FIG. 4, based on the analysis result information AR according to the analysis of the first captured image IMG1 and the second captured image IMG2 described with reference to FIGS. 3A and 3B, the marking part 150 may generate a reference sample SS by marking marking points MP11, MP12, MP13, and MP14 at points on the sample substrate ST corresponding to the positions P11, P12, P13, and P14 of the sample droplets FD1, FD2, FD3, and FD4 at the first time point, and marking marking points MP21, MP22, MP23, MP24 at points on the sample substrate ST corresponding to the positions P21, P22, P23, and P24 of the sample droplets FD1, FD2, FD3, and FD4 at the second time point.

According to an embodiment, each of marking points MP marked on the sample substrate ST by the marking part 150 may include a shade. In an embodiment, for example, each of the marking points MP may include a shade corresponding to the shade of the captured image IG. In such an embodiment, as described with reference to FIG. 2, when the shade detector 142 performs the processing of removing an afterimage with respect to the shade of the captured images IG, each of the marking points MP may include a shade from which the afterimage is removed from the shade of the captured images IG.

In an embodiment, the marking part 150 may implement the shade of the marked marking points MP by forming a fine step on the sample substrate ST or forming chromatic aberration between films.

According to an embodiment, the marking part 150 may mark the marking points MP on the sample substrate ST through a process of forming a pattern on a portion corresponding to the points of the marking points MP on the sample substrate ST. In an embodiment, for example, the marking part 150 may mark the marking points MP on the sample substrate ST using a process such as low pressure chemical vapor deposition ("LPCVD"), normal pressure chemical vapor deposition ("NPCVD"), plasma enhanced chemical vapor deposition ("PECVD"), sputtering, vacuum evaporation, or photolithography. Using the above-described process techniques having high pattern precision, the marking part 150 may form a fine step on the sample substrate ST or form chromatic aberration between films. Accordingly, the shade of the marking points MP may be marked on the reference sample SS.

In an embodiment, the sample substrate ST on which the marking points MP are marked may be a substantially transparent light-transmitting substrate.

In an embodiment, for example, the sample substrate ST may be a rigid substrate including light-transmitting glass or tempered glass, or a flexible substrate made of plastic. However, the material of the sample substrate ST is not limited thereto, and the sample substrate ST may include or be made of at least one selected from various materials having light-transmitting properties.

In an embodiment, as described above, as the sample substrate ST is implemented as a transparent light-transmitting substrate, the shade of the marking points MP marked on the sample substrate ST may be marked more clearly.

However, the material of the sample substrate ST is not limited thereto, and alternatively, the sample substrate ST may be a translucent substrate.

In an embodiment, for example, the sample substrate ST may include or be made of polyimide ("PI"), polyethersulphone ("PES"), polyacrylate ("PAC"), polyarylate ("PAR"), polyetherimide ("PEI"), polyethylene naphthalate ("PEN"), polyethylene terephthalate ("PET"), polyphenylene sulfide ("PPS"), or a combination thereof.

According to an embodiment, the marking points MP may correspond to the shape and size of the sample droplet FD discharged from the nozzle NZ. This is because an embodiment of the apparatus 100 for manufacturing a reference sample according to the invention manufactures the reference sample SS by using the captured image IG obtained with respect to the imaginary plane SF during the period in which the sample droplets FD fall onto the imaginary plane SF.

In an embodiment, for example, as shown in FIG. 4, the marking points MP may have a circular shape corresponding to the shape of the sample droplet FD discharged from the nozzle NZ. However, this is merely one embodiment, and alternatively, the marking points MP may have various shapes corresponding to the shape of the sample droplet FD discharged from the nozzle NZ, such as a polygon, a shape having symmetry, and the like.

As described with reference to FIGS. 1 to 4, an embodiment of the apparatus 100 for manufacturing a reference sample according to the invention may obtain the captured image IG using light radiated with respect to the sample droplets FD discharged from the droplet discharging apparatus, and may manufacture the reference sample SS by marking the marking points MP corresponding to the falling paths of the sample droplets FD and including an optical shade, on the sample substrate ST based on the obtained captured image IG. The reference sample SS manufactured in such a way may be used to measure a droplet discharging characteristic of the droplet discharging apparatus. In such an embodiment, the reference sample SS may include the marking points MP corresponding to the falling paths of the sample droplets FD. Therefore, when using the reference sample SS to measure a droplet, by comparing trajectories of falling droplets with the marking points MP on the reference sample SS, measurement on the droplet discharging characteristic of the droplet discharging apparatus with simplification and high precision may be performed.

Figure 5:
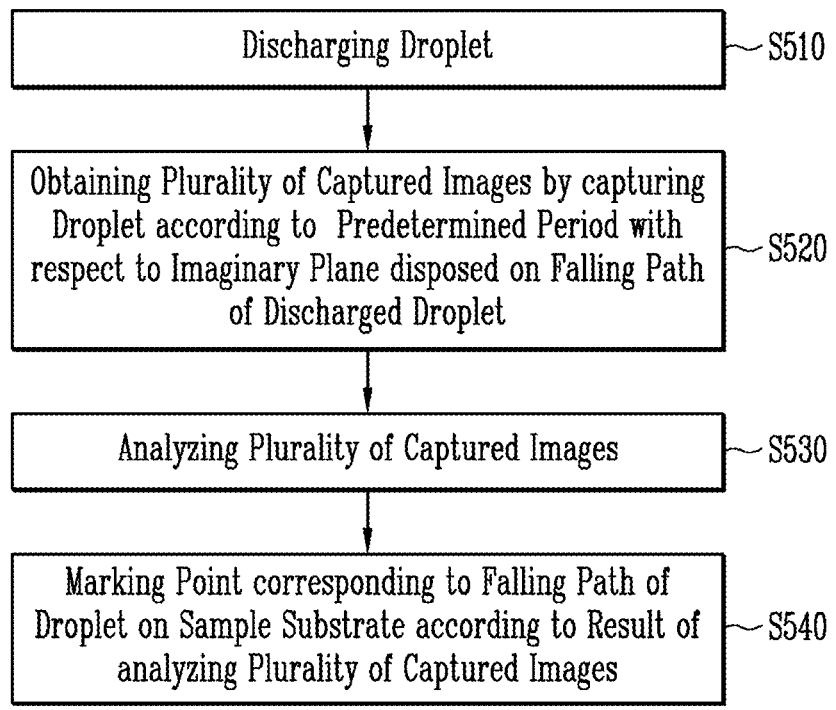
FIG. 5 is a flowchart illustrating a method of manufacturing a reference sample according to an embodiment of the invention.

FIG. 5 is a flowchart illustrating a method of manufacturing a reference sample according to an embodiment of the invention. In an embodiment, a method of manufacturing a reference sample of FIG. 5 may be performed using the apparatus 100 for manufacturing a reference sample of FIG. 1. Therefore, hereinafter, any repetitive detailed description of the same or like elements as those described above with reference to FIGS. 1 to 4 will be omitted.

Referring to FIG. 5, an embodiment of the method of manufacturing a reference sample of FIG. 5 may include discharging a droplet (S510), obtaining a plurality of captured images by capturing the droplet according to a predetermined period with respect to an imaginary plane defined on a falling path of the discharged droplet (S520), analyzing the plurality of captured images (S530), and marking a point corresponding to the falling path of the droplet on a sample substrate based on a result of analyzing the plurality of captured images (S540).

In the discharging the droplet (S510), the droplet discharging apparatus (or the nozzle NZ of the droplet discharging apparatus) described with reference to FIG. 1 may discharge the sample droplet FD.

In the obtaining the plurality of captured images (S520), the light irradiator 120 described with reference to FIGS. 1, 3A, and 3B may sequentially radiate light according to a predetermined period onto the imaginary plane SF disposed on the falling path of the sample droplet FD during the period in which the sample droplet FD falls, and the imaging generator 130 may generate the captured image IG by receiving the light that has passed through the imaginary plane SF. In an embodiment, for example, as described with reference to FIGS. 1, 3A, and 3B, when the light irradiator 120 sequentially radiates light at the first time point and the second time point during the period in which the sample droplet FD falls, the obtaining the plurality of captured images (S520) may include obtaining a first captured image (for example, the first captured image IMG1 shown in FIG. 3A) corresponding to the first time point and obtaining a second captured image (for example, the second captured image IMG2 shown in FIG. 3B) corresponding to the second time point.

In the analyzing the plurality of captured images (S530), the image analyzer 140 described with reference to FIGS. 1, 2, 3A, and 3B may extract information on the falling path, falling speed, size (volume), and the like of the sample droplet FD by analyzing the captured image IG, so that the analysis result information AR may be generated.

In the marking the point corresponding to the falling path of the droplet on the sample substrate, the marking part 150 described with reference to FIGS. 1 to 4 may manufacture the reference sample SS by marking the marking points MP on the sample substrate ST based on the points corresponding to the falling paths of the sample droplets FD based on the analysis result information AR.

Figure 6:
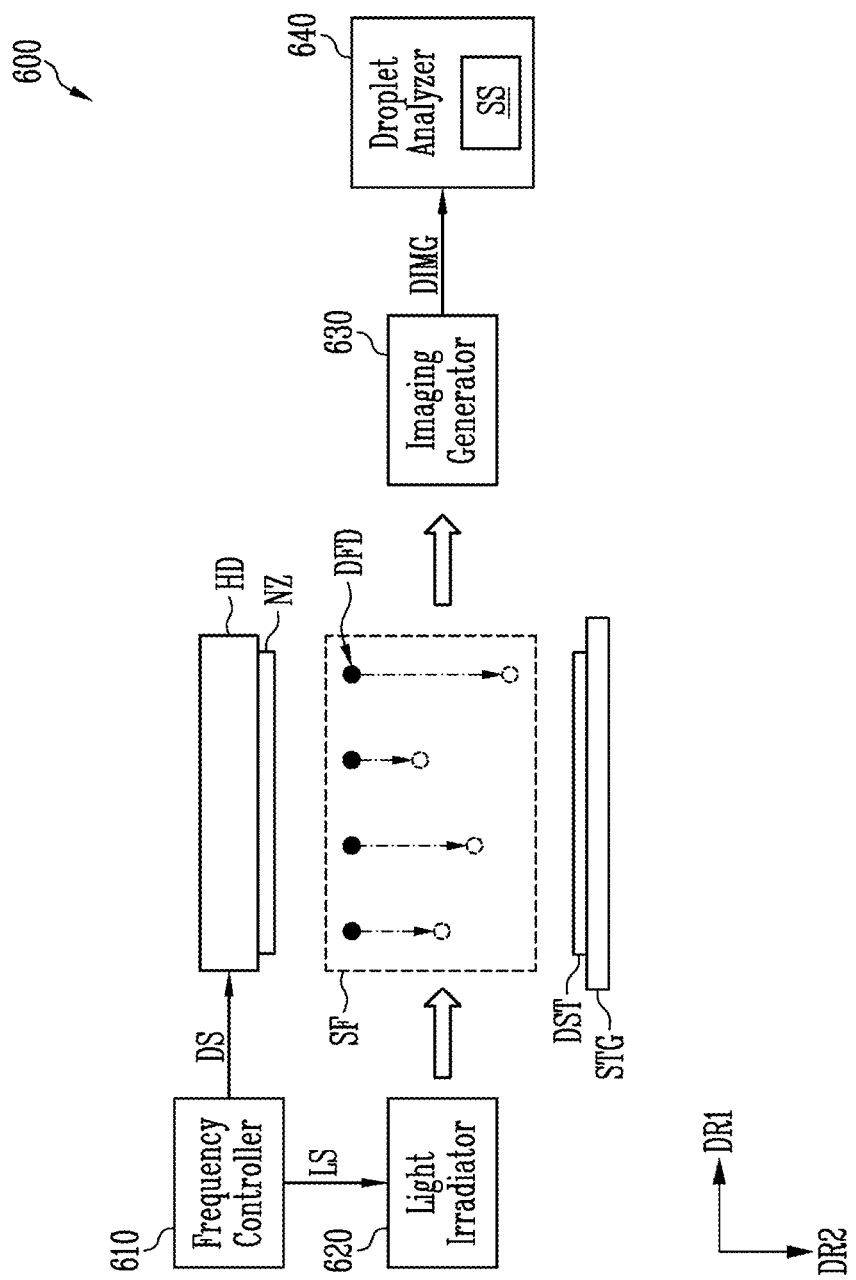
FIG. 6 is a block diagram illustrating an apparatus for measuring a droplet according to an embodiment of the invention.
Figure 7:
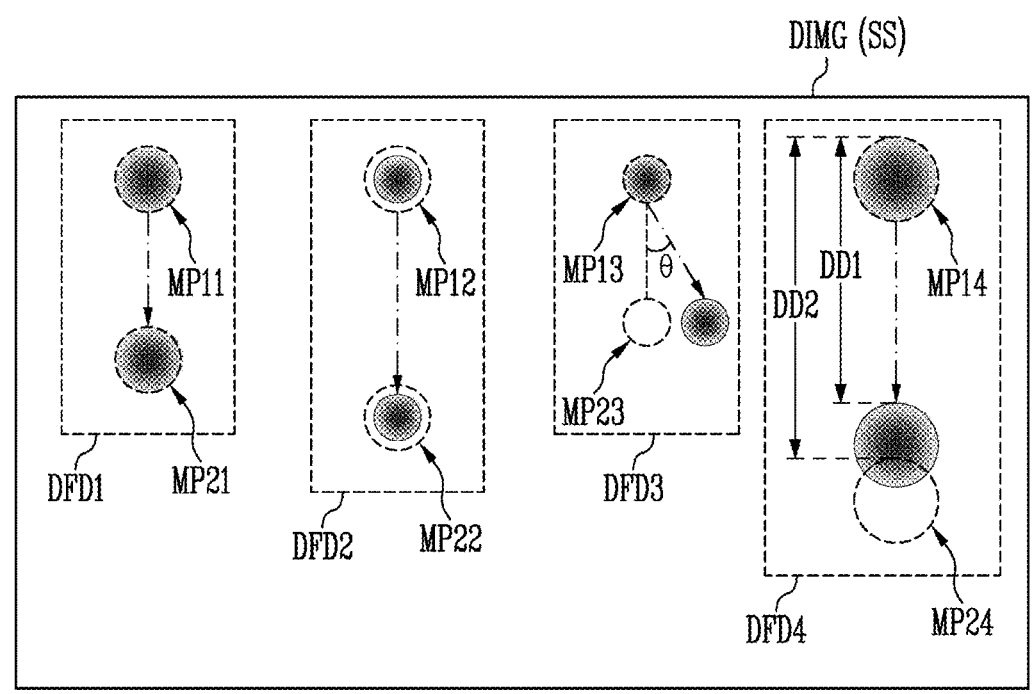
FIG. 7 is a diagram for explaining an embodiment of an operation in which the apparatus for measuring a droplet of FIG. 6 measures the discharged droplet using a reference sample.

FIG. 6 is a block diagram illustrating an apparatus for measuring a droplet according to an embodiment of the invention. FIG. 7 is a diagram for explaining an embodiment of an operation in which the apparatus for measuring a droplet of FIG. 6 measures the discharged droplet using a reference sample.

Referring to FIG. 6, an embodiment of an apparatus 600 for measuring a droplet according to the invention may measure a discharging characteristic of a deposition droplet DFD in the droplet discharging apparatus by comparing a droplet capture image DIMG obtained by capturing the deposition droplet DFD discharged from the droplet discharging apparatus with the reference sample SS. In an embodiment, for example, the apparatus 600 for measuring a droplet may measure the trajectory of the falling motion of the deposition droplet DFD, the size (volume) of the deposition droplet DFD, a change in the size (volume), and the like by comparing the position and/or size (volume) of the deposition droplet DFD on the captured image with the positions and/or sizes of the marking points (for example, the marking points MP of FIG. 4) of the reference sample SS.

In such an embodiment, the reference sample SS may be substantially the same as or similar to the reference sample SS described with reference to FIGS. 1 to 4. In an embodiment, for example, the reference sample SS may include marking points (for example, the marking points MP of FIG. 4) provided based on points corresponding to a reference falling path (for example, the falling path of the sample droplet FD of FIG. 1) of the droplet (for example, the sample droplet FD of FIG. 1).

In an embodiment, the deposition droplet DFD may mean a droplet discharged from the nozzle NZ of the head unit HD included in the droplet discharging apparatus to deposit a thin film on a deposition substrate DST on a stage STG.

In order for the apparatus 600 for measuring a droplet as described above to obtain the captured image of the deposited droplet DFD, the apparatus 600 for measuring a droplet may include a frequency controller 610, a light irradiator 620, an imaging generator 630, and a droplet analyzer 640. In such an embodiment, the frequency controller 610, the light irradiator 620, and the imaging generator 630 included in the apparatus 600 for measuring a droplet may be substantially the same as or similar to the frequency controller 110, the light irradiator 120, and the imaging generator 130 described with reference to FIG. 1.

In an embodiment, for example, the frequency controller 610 of the apparatus 600 for measuring a droplet may generate a droplet discharge control signal DS for controlling a time point at which the deposition droplet DFD is discharged from the droplet discharge apparatus and a light irradiation control signal LS for controlling a time point at which light is irradiated from the light irradiator 620.

In such an embodiment, during the period from a time point at which the deposition droplet DFD is discharged from the nozzle NZ to a time point at which the deposition droplet DFD arrives at the deposition substrate DST (the period in which the deposition droplet DFD falls), the light irradiator 620 of the apparatus 600 for measuring a droplet may sequentially radiate light a plurality of times according to a predetermined period onto the imaginary plane SF disposed on the falling path of the deposition droplet DFD between the nozzle NZ and the deposition substrate DST based on the light irradiation control signal LS.

In such an embodiment, the imaging generator 630 of the apparatus 600 for measuring a droplet may generate the droplet capture image DIMG of the deposition droplet DFD by receiving the light passing through the imaginary plane SF. Here, the droplet capture image DIMG may correspond to still images of the deposition droplet DFD corresponding to each time point at which the light irradiator 620 irradiates light.

The droplet capture image DIMG of the deposition droplet DFD generated by the imaging generator 630 may be generated in substantially the same manner as the captured image IG of the sample droplet FD described with reference to FIGS. 1, 3A, and 3B. In an embodiment, for example, similar to the operation of the imaging generator 130 described with reference to FIGS. 1 to 3B, the imaging generator 630 may generate a first droplet capture image corresponding to the first time point and a second droplet capture image corresponding to the second time point after the first time point.

In an embodiment, the droplet analyzer 640 may measure the falling path, falling speed, and size (volume) of the deposition droplet DFD, and the change in the size (volume) by comparing the deposition droplet DFD on the droplet capture image DIMG with the marking points (for example, the marking points MP of FIG. 4) on the reference sample SS.

In an embodiment, for example, referring further to FIG. 7, FIG. 7 shows the marking points MP of the reference sample SS indicated by a dotted line and the deposition droplet DFD on the droplet capture image DIMG indicated by a shade.

In an embodiment, for example, the droplet analyzer 640 may compare a first deposition droplet DFD1 with marking points MP11 and MP21 corresponding to the first deposition droplet DFD1. In such an embodiment, since the position and size of the first deposition droplet DFD1 are substantially the same as or similar to the positions and sizes of the marking points MP11 and MP21, the droplet analyzer 640 may determine that the first deposition droplet DFD1 has a desired discharging characteristic.

In an embodiment, the droplet analyzer 640 may compare a second deposition droplet DFD2 with marking points MP12 and MP22 corresponding to the second deposition droplet DFD2. In such an embodiment, since the position of the second deposition droplet DFD2 is substantially the same as or similar to the positions of the marking points MP12 and MP22, but the size (or volume) of the shade of the second deposition droplet DFD2 is smaller than the sizes of the marking points MP12 and MP22, the droplet analyzer 640 may determine that a discharging characteristic of the second deposition droplet DFD2 (for example, the discharge pressure or discharge amount of the second deposition droplet DFD2) is inferior to a reference discharging characteristic.

In an embodiment, the droplet analyzer 640 may compare a third deposition droplet DFD3 with marking points MP13 and MP23 corresponding to the third deposition droplet DFD3. In such an embodiment, since the size (or volume) of the shade of the third deposition droplet DFD3 is substantially the same as or similar to the sizes (or volumes) of the marking points MP13 and MP23, but among the positions of the third deposition droplet DFD3, the position at the second time point is different from the position of the marking point MP23 at the second time point (that is, the third deposition droplet DFD3 is discharged at a different angle by a predetermined angle θ compared to the marking points MP13 and MP23), the droplet analyzer 640 may determine that a discharging characteristic of the third deposition droplet DFD3 (for example, the discharge direction of the third deposition droplet DFD3) is inferior to the reference discharging characteristic.

In an embodiment, the droplet analyzer 640 may compare a fourth deposition droplet DFD4 with marking points MP14 and MP24 corresponding to the fourth deposition droplet DFD4. In such an embodiment, since the size (or volume) of the shade of the fourth deposition droplet DFD4 is substantially the same as or similar to the sizes (or volumes) of the marking points MP14 and MP24, but among the positions of the fourth deposition droplet DFD4, the position at the second time point (e.g., a distance DD1 along the second direction DR2 from the marking point MP14) is different from the position of the marking point MP24 at the second time point (e.g., a distance DD2 along the second direction DR2 from the marking point MP14), the droplet analyzer 640 may determine that a discharging characteristic of the fourth deposition droplet DFD4 (for example, the discharge pressure of the fourth deposition droplet DFD4) is inferior to the reference discharging characteristic.

As described with reference to FIGS. 6 and 7, an embodiment of the apparatus 600 for measuring a droplet according to the invention may measure the discharging characteristic of the deposition droplet in the droplet discharging apparatus by comparing the droplet capture image DIMG of the deposition droplet DFD with the reference sample SS. In such an embodiment, the apparatus 600 for measuring a droplet may perform measurement on the droplet discharging characteristic of the droplet discharging apparatus with simplification and high precision by comparing the trajectory of the falling deposition droplet DFD with the marking points MP on the reference sample SS.

Figure 8:
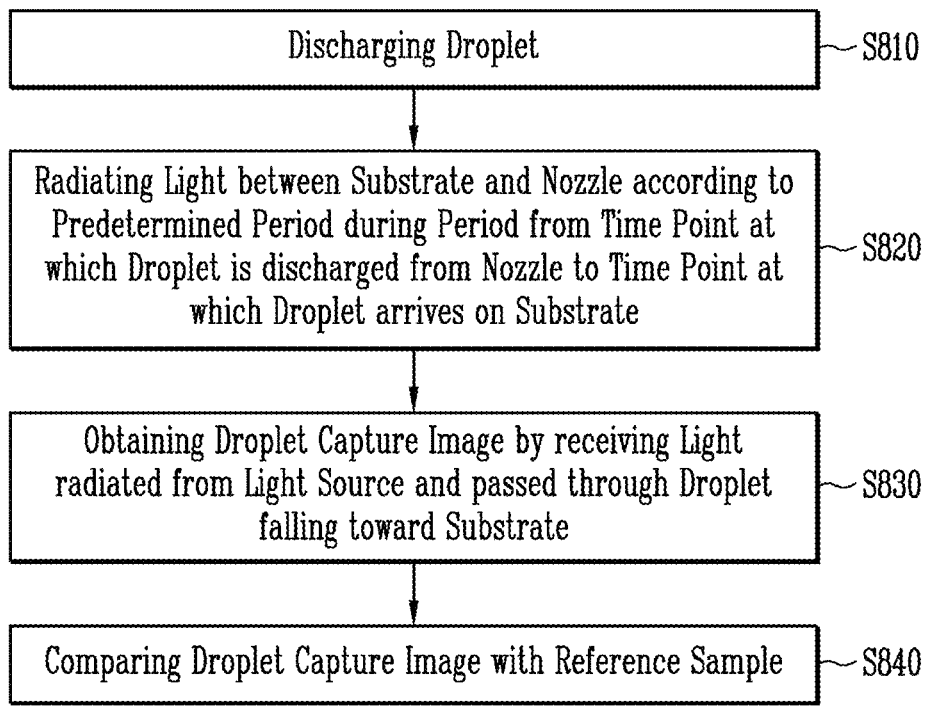
FIG. 8 is a flowchart illustrating a method of measuring a droplet according to an embodiment of the invention.

FIG. 8 is a flowchart illustrating a method of measuring a droplet according to an embodiment of the invention. A method of measuring a droplet according to an embodiment of the invention of FIG. 8 may be performed using the apparatus 600 for measuring a droplet of FIG. 6. Therefore, hereinafter, any repetitive detailed descriptions of the same or like elements as those described with reference to FIGS. 6 and 7 will be omitted.

Referring to FIG. 8, a method of measuring a droplet of FIG. 8 may include discharging a droplet (S810), radiating light between the substrate and the nozzle according to a predetermined period during a period from a time point at which the droplet is discharged from the nozzle to a time point at which the droplet arrives on the substrate (S820), obtaining a droplet capture image by receiving the light radiated from a light source and passed through the droplet falling toward the substrate (S830), and comparing the droplet capture image with the reference sample (S840).

In the discharging the droplet (S810), the droplet discharging apparatus described with reference to FIG. 6 may discharge the deposition droplets DFD.

In the radiating the light (S820), the light irradiator 620 described with reference to FIG. 6 may sequentially radiate light according to the predetermined period during a period in which the deposition droplet DFD falls onto the imaginary plane SF disposed on the falling path of the deposition droplet DFD.

In the obtaining the droplet capture image by receiving the light radiated from the light source and passed through the droplet falling toward the substrate (S830), the imaging generator 630 described with reference to FIG. 6 may generate the droplet capture image DIMG.

In the comparing the droplet capture image with the reference sample (S840), the droplet analyzer 640 described with reference to FIGS. 6 and 7 may compare the droplet capture image DIMG with the reference sample SS.

According to embodiments of the invention, the reference sample used to measure the droplet discharging characteristic of the droplet discharging apparatus may be manufactured.

In embodiments of the invention, measurement on the droplet discharging characteristic of the droplet discharging apparatus in measuring the discharging characteristic of the droplet discharging apparatus may be performed with simplification and high precision by comparing the trajectories of the falling droplets with the marking points on the reference sample.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A method of measuring a droplet discharged from a nozzle onto a substrate, the method comprising:
   discharging the droplet;
   radiating light between the substrate and the nozzle according to a predetermined period during a period from a time point at which the droplet is discharged from the nozzle to a time point at which the droplet arrives on the substrate;
   obtaining a droplet capture image by receiving the light radiated from a light source and passed through the droplet falling toward the substrate; and
   comparing the droplet capture image with a reference sample,
   wherein the reference sample includes marking points that were generated on a two-dimensional surface or image by discharging a reference droplet and indicating a reference falling path of the reference droplet on the reference sample prior to the discharging of the droplet.

2. The method of claim 1, wherein the obtaining the droplet capture image includes:
   obtaining a first droplet capture image at a first time point; and
   obtaining a second droplet capture image at a second time point after the first time point.

3. The method of claim 2, wherein the marking points include a marking point for a point corresponding to the reference falling path of the droplet at the first time point and a marking point for a point corresponding to the reference falling path of the droplet at the second time point.

4. The method of claim 3, wherein the comparing the droplet capture image with the reference sample includes:
   comparing a position and a size of the droplet on the first droplet capture image with a position and a size of the marking point corresponding to the first time point; and
   comparing a position and a size of the droplet on the second droplet capture image with a position and a size of the marking point corresponding to the second time point.

5. The method of claim 1, wherein each of the marking points included in the reference sample and the droplet on the droplet capture image includes a shade.

6. The method of claim 1, wherein the nozzle and the substrate are spaced apart and aligned along a second direction to define an imaginary plane therebetween, and the droplet passes through the imaginary plane.

7. The method of claim 6, wherein the light is radiated from a light irradiator along a first direction orthogonal to the second direction to pass through the imaginary plane between the substrate and the nozzle towards an imaging generator.

8. The method of claim 7, wherein the light irradiator and the imaging generator are spaced apart and aligned along the first direction with the imaginary plane therebetween.

9. The method of claim 1, wherein the reference sample is a sample substrate having the two-dimensional surface that includes the marking points.

10. The method of claim 1, wherein the marking points indicate sizes and positions of the reference droplet at a plurality of time points in the reference falling path of the reference droplet.

11. An apparatus for measuring a droplet discharged from a nozzle onto a substrate comprising:
   a light irradiator which radiates light between the substrate and the nozzle according to a predetermined period during a period from a time point at which the droplet is discharged from the nozzle to a time point at which the droplet arrives on the substrate;
   an imaging generator which receives the light radiated from the light irradiator and passed through the droplet falling toward the substrate to generate a droplet capture image; and
   a droplet analyzer which compares the droplet capture image with a reference sample,
   wherein the reference sample includes marking points that were generated on a two-dimensional surface or image by discharging a reference droplet and indicating a reference falling path of the reference droplet on the reference sample prior to the discharging of the droplet.

12. The apparatus of claim 11, wherein the imaging generator generates a first droplet capture image at a first time point and a second droplet capture image at a second time point after the first time point.

13. The apparatus of claim 12, wherein the marking points include a marking point for a point corresponding to the reference falling path of the droplet at the first time point and a marking point for a point corresponding to the reference falling path of the droplet at the second time point.

14. The apparatus of claim 13, wherein the droplet analyzer compares a position and a size of the droplet on the first droplet capture image with a position and a size of the marking point corresponding to the first time point, and compares a position and a size of the droplet on the second droplet capture image with a position and a size of the marking point corresponding to the second time point.

15. The apparatus of claim 11, wherein each of the marking points included in the reference sample and the droplet on the droplet capture image includes a shade.

16. The apparatus of claim 11, wherein the nozzle and the substrate are spaced apart and aligned along a second direction to define an imaginary plane therebetween, and the droplet passes through the imaginary plane.

17. The apparatus of claim 16, wherein the light irradiator radiates the light along a first direction orthogonal to the second direction to pass through the imaginary plane between the substrate and the nozzle towards the image generator.

18. The apparatus of claim 17, wherein the light irradiator and the imaging generator are spaced apart and aligned along the first direction with the imaginary plane therebetween.

19. The apparatus of claim 11, wherein the reference sample is a sample substrate having the two-dimensional surface that includes the marking points.

20. The apparatus of claim 11, wherein the marking points indicate sizes and positions of the reference droplet at a plurality of time points in the reference falling path of the reference droplet.

* * * * *